US009001710B2

(12) United States Patent  
Uejima

(10) Patent No.: US 9,001,710 B2  
(45) Date of Patent: Apr. 7, 2015

(54) HIGH-FREQUENCY MODULE

(71) Applicant: Murata Manufacturing Co., Ltd., Nagaokakyo-shi, Kyoto-fu (JP)

(72) Inventor: Takanori Uejima, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 162 days.

(21) Appl. No.: 13/915,854

(22) Filed: Jun. 12, 2013

(65) Prior Publication Data

US 2013/0272176 A1 Oct. 17, 2013

Related U.S. Application Data

(63) Continuation of application No. PCT/JP2011/078243, filed on Dec. 7, 2011.

(30) Foreign Application Priority Data

Jan. 6, 2011 (JP) .................................. 2011-000876

(51) Int. Cl.  
*H04B 1/44* (2006.01)  
*H04B 1/00* (2006.01)

(52) U.S. Cl.  
CPC ................ *H04B 1/44* (2013.01); *H04B 1/0057* (2013.01); *H04B 1/006* (2013.01); *H04B 1/525* (2013.01)

(58) Field of Classification Search  
CPC .. H04L 2012/5614; H04J 3/00; H04J 3/1682; H04Q 2213/036; H04Q 2213/13036; H04B 1/18; H04B 1/48  
USPC ........................................ 370/463; 455/552.1  
See application file for complete search history.

(56) References Cited

U.S. PATENT DOCUMENTS

2002/0186097 A1 12/2002 Sakuragawa et al.  
2004/0071111 A1 4/2004 Satoh et al.  
(Continued)

FOREIGN PATENT DOCUMENTS

CN 1574664 A 2/2005  
JP 2001-352227 A 12/2001  
(Continued)

OTHER PUBLICATIONS

Official Communication issued in International Patent Application No. PCT/JP2011/078243, mailed on Jan. 10, 2012.

(Continued)

*Primary Examiner* — Kwang B Yao  
*Assistant Examiner* — Syed M Bokhari  
(74) *Attorney, Agent, or Firm* — Keating & Bennett, LLP

(57) ABSTRACT

In a high-frequency module, first, second and third duplexers are aligned and mounted on a top surface of a multilayer body. The second duplexer, the frequency band of which is spaced apart from those of the first duplexer and the third duplexer, is arranged between the first duplexer and the third duplexer, the frequency bands of which are close to each other. This causes the spacing between the first and third duplexers, the frequencies of signals transmitted and received through which are close to each other, to be increased to suppress or prevent unnecessary electromagnetic field coupling between the first and third duplexers. In addition, also with the second duplexer, the frequency band of which is spaced apart from those of the first and third duplexers and which exists between the first and third duplexers, the unnecessary electromagnetic field coupling is suppressed or prevented between the first and third duplexers.

12 Claims, 9 Drawing Sheets

(56) References Cited

U.S. PATENT DOCUMENTS

| | | |
|---|---|---|
| 2004/0240183 A1 | 12/2004 | Ishizaki |
| 2005/0003855 A1 | 1/2005 | Wada et al. |
| 2005/0037804 A1* | 2/2005 | Yajima et al. .............. 455/552.1 |
| 2006/0262028 A1 | 11/2006 | Takei |
| 2011/0279193 A1 | 11/2011 | Furutani |

FOREIGN PATENT DOCUMENTS

| | | |
|---|---|---|
| JP | 2003-152588 A | 5/2003 |
| JP | 2004-064058 A | 2/2004 |
| JP | 2004-363926 A | 12/2004 |
| JP | 2006-211057 A | 8/2006 |
| JP | 2006-333127 A | 12/2006 |
| JP | 2007-97117 A | 4/2007 |
| JP | 2008-017439 A | 1/2008 |
| WO | 03/036806 A1 | 5/2003 |
| WO | 2004/036687 A1 | 4/2004 |
| WO | 2010/087307 A1 | 8/2010 |
| WO | 2010/143471 A1 | 12/2010 |

OTHER PUBLICATIONS

Official Communication issued in corresponding Chinese Patent Application No. 201180064362.1, mailed on May 4, 2014.

* cited by examiner

FIG. 2
| SIGNAL NAME | Tx | | | Rx | | |
|---|---|---|---|---|---|---|
| | MIN. | CENT. | MAX. | MIN. | CENT. | MAX. |
| GSM900 | 880 | 897.5 | 915 | 925 | 942.5 | 960 |
| GSM1800 | 1710 | 1747.5 | 1785 | 1805 | 1842.5 | 1880 |
| GSM1900 | 1850 | 1880 | 1910 | 1930 | 1960 | 1990 |
| WCDMA(Band1) | 1920 | 1950 | 1980 | 2110 | 2140 | 2170 |
| WCDMA(Band2) | 1850 | 1880 | 1910 | 1930 | 1960 | 1990 |
| WCDMA(Band5) | 824 | 836.5 | 849 | 869 | 881.5 | 894 |
| WCDMA(Band7) | 2500 | 2535 | 2570 | 2620 | 2655 | 2690 |
FIG. 3A
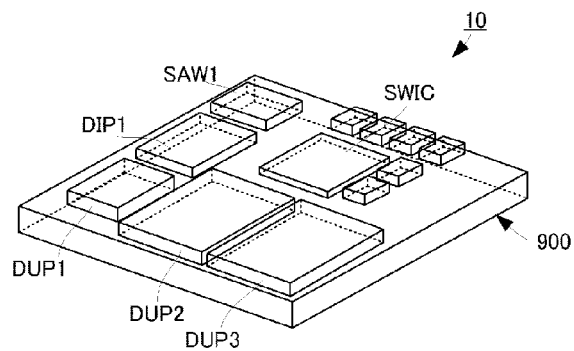
FIG. 3B
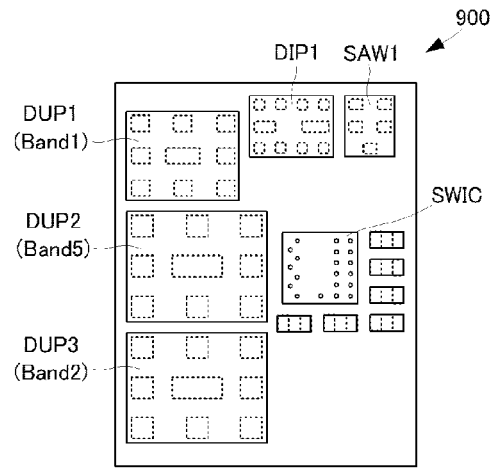

HIGH-FREQUENCY MODULE

BACKGROUND OF THE INVENTION

1. Field of the Invention

The present invention relates to a high-frequency module that transmits and receives multiple communication signals with a common antenna.

2. Description of the Related Art

Various high-frequency modules that each transmit and receive multiple communication signals using different frequency bands with a common antenna are known. Such high-frequency modules include, for example, high-frequency modules described in Japanese Unexamined Patent Application Publication No. 2003-152588 and Japanese Unexamined Patent Application Publication No. 2006-333127.

The high-frequency modules described in Japanese Unexamined Patent Application Publication No. 2003-152588 and Japanese Unexamined Patent Application Publication No. 2006-333127 each include a switch integrated circuit (IC) and multiple demultiplexers. A high-frequency module described in Japanese Unexamined Patent Application Publication No. 2007-97117 includes a surface acoustic wave duplexer (hereinafter referred to as a SAW duplexer).

Many such high-frequency modules are reduced in size in order to, for example, be used for mobile communication terminals. A high-frequency module has been proposed in which internal electrode patterns of a multilayer body are combined with mounting circuit elements (for example, SAW duplexers) mounted on the multilayer body.

However, the spacing between the mounting circuit elements mounted on a front surface of the multilayer body is decreased as the high-frequency module is increasingly reduced in size. In particular, when the mounting circuit elements are demultiplexers, such as duplexers, the decrease in the spacing between the demultiplexers causes interference between the demultiplexers to be likely to occur. As a result, a problem is caused in which the isolation between the communication signals is likely to be reduced.

SUMMARY OF THE INVENTION

Accordingly, preferred embodiments of the present invention provide high-frequency modules that significantly suppress or prevent a reduction in isolation characteristics between communication signals even when the spacing between mounting circuit elements is decreased due to a reduction in size of the module.

Various preferred embodiments of the present invention relate to a high-frequency module that transmits and receives a plurality of communication signals at least including a first communication signal, a second communication signal, and a third communication signal. The high-frequency module includes a switching element that selects one individual terminal from at least three individual terminals and connects the selected individual terminal to a common terminal; and demultiplexers that are connected to the respective at least three individual terminals of the switching element. The switching element and the demultiplexers are mounted on a front surface of a multilayer body of the high-frequency module. The first communication signal, the second communication signal, and the third communication signal each preferably include a transmission signal and a reception signal. A difference between a frequency band of the first communication signal and a frequency band of the second communication signal is smaller than a difference between the frequency band of the first communication signal and the frequency band of the third communication signal and a difference between the frequency band of the second communication signal and the frequency band of the third communication signal. A third demultiplexer through which the third communication signal is transmitted is mounted between a mounting position of a first demultiplexer through which the first communication signal is transmitted and a mounting position of a second demultiplexer through which the second communication signal is transmitted.

With the above configuration, the arrangement of the duplexer for the third communication signal, the frequency band of which is relatively spaced apart from those of the first communication signal and the second communication signal, causes the difference between the duplexer for the first communication signal and the duplexer for the second communication signal, the frequency bands of the first communication signal and the second communication signal being relative close to each other, to be increased to suppress or prevent unnecessary electromagnetic field coupling and electrostatic coupling. In addition, the arrangement of the duplexer for the third communication signal between the duplexer for the first communication signal and the duplexer for the second communication signal allows the unnecessary electromagnetic field coupling and electrostatic coupling between the duplexer for the first communication signal and the duplexer for the second communication signal the frequency bands of which are relatively close to each other to be further suppressed or prevented. Accordingly, it is possible to increase the isolation between the duplexers the frequency bands of which are close to each other.

The high-frequency module according to various preferred embodiments of the present invention is more effective when a difference between the transmission signal of the first communication signal and the reception signal of the second communication signal is smaller than a difference between the first communication signal and the third communication signal and a difference between the second communication signal and the third communication signal. This configuration indicates a specific example of a preferred embodiment to which the present invention is most effectively applied according to the specifications currently used.

A high-frequency module according to a preferred embodiment of the present invention more preferably has the following configuration. The first demultiplexer, the second demultiplexer, and the third demultiplexer each include a transmission-side filter and a reception-side filter, which are preferably composed of separate elements. The transmission-side filters and the reception-side filters are mounted so as to be spaced apart from each other on the front surface of the multilayer body.

With the above configuration, since the transmission-side filter and the reception-side filter of each duplexer are not integrated with each other and are arranged at positions that are spaced apart from each other on the top surface of the multilayer body, the spacing between the transmission-side filter and the reception-side filter is increased, compared with the case in which the transmission-side filter is integrated with the reception-side filter. Accordingly, the unnecessary electromagnetic field coupling between the transmission-side filter and the reception-side filter is suppressed or prevented. In addition, since the transmission-side filter and the reception-side filter are provided in separate housings, the housing of each single filter element is reduced in size, compared with the housing of the duplexer in the related art in which the transmission-side filter is integrated with the reception-side filter. Accordingly, the selectivity of a mounting pattern for the reduction in size is improved.

A high-frequency module according to a preferred embodiment of the present invention more preferably has the following configuration. The switching element has a substantially quadrangle shape in a plan view and a power supply terminal is arranged near one side in the plan view. The switching element is mounted on the front surface of the multilayer body so that the other side of the switching element, opposing the one side, is at a side where the transmission-side filters are mounted.

With the above configuration, since the distance between the transmission-side filters and the power supply terminal of the switching element is increased, the high-power transmission signal leaking from the transmission-side filters is prevented from being input into the power supply terminal of the switching element. Accordingly, it is possible to suppress or prevent superimposition of the transmission signal on the drive voltage and the control voltage to the switching element to prevent deterioration in characteristics of the switching element.

A high-frequency module according to a preferred embodiment of the present invention more preferably has the following configuration. A circuit element other than the switching element and each filter of each demultiplexer is mounted on the front surface of the multilayer body. The other circuit element is mounted between the switching element and the transmission-side filters.

With the above configuration, since the other circuit element is arranged between the switching element and the transmission-side filters, the unnecessary electromagnetic field coupling between the switching element and the transmission-side filters is suppressed or prevented.

A high-frequency module according to a preferred embodiment of the present invention more preferably has the following configuration. External-connection port electrodes including a transmission signal input port electrode are provided for each communication signal on a rear surface of the multilayer body. A transmission signal input terminal of each transmission-side filter and the transmission signal input port electrode are arranged so that the transmission signal input terminal is at least partially overlapped with the transmission signal input port electrode in a plan view of the multilayer body.

In the above configuration, the electrode on which the transmission signal input terminal of the transmission-side filter formed on the top surface of the multilayer body is mounted is arranged at substantially the same position as that of the transmission signal input port electrode provided on the bottom surface of the multilayer body in a plan view of the multilayer body. Accordingly, wiring along the normal stacking direction allows the electrode patterns of the transmission system on the inner layers through which the electrode on which the transmission signal input terminal of the transmission-side filter is mounted is connected to the transmission signal input port electrode to be shortened. Accordingly, it is possible to suppress or prevent the electrode pattern of the transmission system to be subjected to the electromagnetic filed coupling to another electrode pattern, such as the electrode pattern of the reception system.

A high-frequency module according to a preferred embodiment of the present invention more preferably has the following configuration. An electrode on which the transmission signal input terminal of the transmission-side filter is mounted is connected to the transmission signal input port electrode only via a via electrode provided in a stacking direction of the multilayer body.

With the above configuration, the electrode on which the transmission signal input terminal of the transmission-side filter is mounted is connected to the transmission signal input port electrode at a shortest distance along the stacking direction. Accordingly, it is possible to further suppress or prevent the electrode pattern of the transmission system to be subjected to the electromagnetic filed coupling to another electrode pattern, such as the electrode pattern of the reception system.

A high-frequency module according to a preferred embodiment of the present invention more preferably has the following configuration. A reception signal output port electrode is provided for each communication signal on the rear surface of the multilayer body. A reception signal output terminal of each reception-side filter and the reception signal output port electrode are arranged so that the reception signal output terminal is at least partially overlapped with the reception signal output port electrode in the plan view of the multilayer body.

In the above configuration, the electrode on which the reception signal output terminal of the reception-side filter provided on the top surface of the multilayer body is mounted is arranged at substantially the same position as that of the reception signal output port electrode provided on the bottom surface of the multilayer body in a plan view of the multilayer body. Accordingly, wiring along the normal stacking direction allows the electrode patterns of the reception system on the inner layers through which the electrode on which the reception signal output terminal of the reception-side filter is mounted is connected to the reception signal output port electrode to be shortened. Accordingly, it is possible to suppress or prevent the electrode pattern of the reception system to be subjected to the electromagnetic filed coupling to another electrode pattern, such as the electrode pattern of the transmission system.

A high-frequency module according to a preferred embodiment of the present invention more preferably has the following configuration. An electrode on which the reception signal output terminal of the reception-side filter is mounted is connected to the reception signal output port electrode only via a via electrode provided in a stacking direction of the multilayer body.

With the above configuration, the electrode on which the reception signal output terminal of the reception-side filter is mounted is connected to the reception signal output port electrode at a shortest distance along the stacking direction. Accordingly, it is possible to further suppress or prevent the electrode pattern of the reception system to be subjected to the electromagnetic filed coupling to another electrode pattern, such as the electrode pattern of the transmission system.

A high-frequency module according to a preferred embodiment of the present invention more preferably has the following configuration. The transmission-side filters are integrally preferably provided in a single housing.

A high-frequency module according to a preferred embodiment of the present invention more preferably has the following configuration. The reception-side filters preferably are integrally provided in a single housing.

With the above configurations, it is possible to reduce the size, compared with a case in which the multiple transmission-side filters and the multiple reception-side filters are separately arranged.

A high-frequency module according to a preferred embodiment of the present invention more preferably has the following configuration. The switching element is mounted between an area where the transmission-side filters are mounted and an area where the reception-side filters are mounted.

With the above configuration, since the switching element exists between the transmission-side filters and the reception-side filters, it is possible to suppress or prevent the unnecessary electromagnetic filed coupling between the transmission-side filters and the reception-side filters.

According to various preferred embodiments of the present invention, it is possible to realize a compact high-frequency module having high isolation between multiple communication signals.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 2 is a table indicating a list of the transmission frequency bands and the reception frequency bands of communication signals.

FIGS. 3A and 3B are diagrams for describing the structure of the high-frequency module 10 according to the first preferred embodiment of the present invention.

DETAILED DESCRIPTION OF THE PREFERRED EMBODIMENTS

A high-frequency module according to a first preferred embodiment of the present invention will herein be described with reference to the attached drawings. The high-frequency module described in the present preferred embodiment preferably transmits and receives Global System for Mobile Communications (GSM) 900 communication signals, GSM 1800 communication signals, GSM 1900 communication signals, and communication signals of band classes Band 1, Band 2, and Band 5 of Wideband Code Division Multiple Access (W-CDMA) communication system, that is, transmits and receives six types of communication signals, for example. GSM 900, GSM 1800, and GSM 1900 transmission and reception circuits may be omitted, for example.

Although a switch IC is used as an example of a switching element in the following description, a switching element having another structure may be applied.

Figure 1:
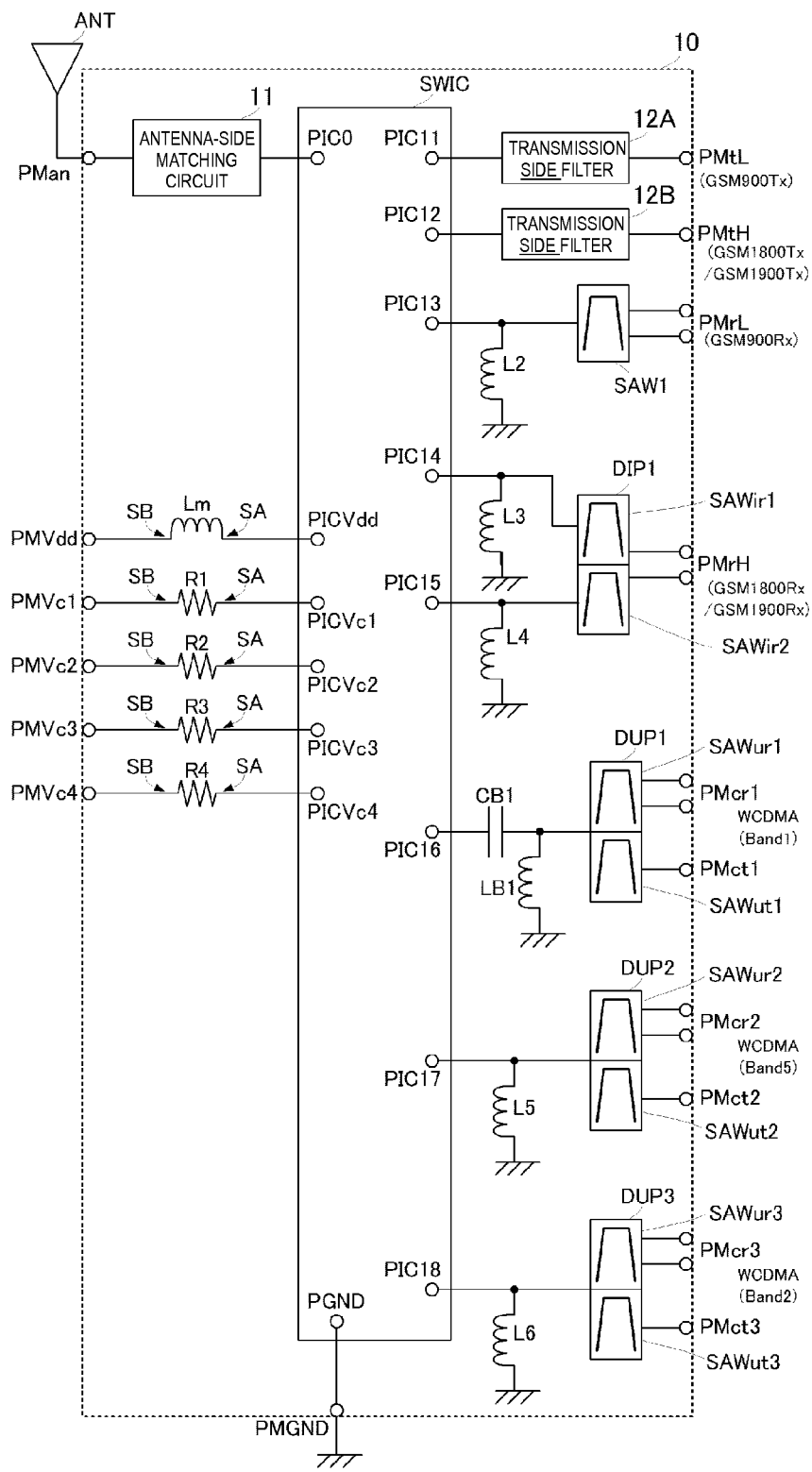
FIG. 1 is a block diagram illustrating a circuit configuration of a high-frequency module 10 according to a first preferred embodiment of the present invention.

A circuit configuration of a high-frequency module 10 of the present preferred embodiment will now be described. FIG. 1 is a block diagram illustrating the circuit configuration of the high-frequency module 10 according to the present preferred embodiment.

A switching element SWIC includes a single common terminal PIC0 and eight individual terminals PIC11 to PIC18. The switching element SWIC includes a ground terminal PGND for connection to a ground GND. The ground terminal PGND is connected to an external-connection ground port electrode PMGND of the high-frequency module 10.

The switching element SWIC includes a drive voltage application terminal PICVdd and multiple control voltage application terminals PICVc1, PICVc2, PICVc3, and PICVc4. The drive voltage application terminal PICVdd is connected to an external-connection electrical power system port electrode PMVdd of the high-frequency module 10. The control voltage application terminals PICVc1, PICVc2, PICVc3, and PICVc4 are connected to external-connection electrical power system port electrodes PMVc1, PMVc2, PMVc3, and PMVc4 of the high-frequency module 10, respectively.

The switching element SWIC is driven in response to a drive voltage Vdd applied through the drive voltage application terminal PICVdd. The switching element SWIC connects the single common terminal PIC0 to any of the eight individual terminals PIC11 to PIC18 in response to a combination of control voltages Vc1, Vc2, Vc3, and Vc4 applied to the multiple control voltage application terminals PICVc1, PICVc2, PICVc3, and PICVc4, respectively.

The common terminal PIC0 is connected to an external-connection port electrode PMan of the high-frequency module 10 via an antenna-side matching circuit 11 also functioning as an electrostatic discharge (ESD) circuit. The port electrode PMan is connected an external antenna ANT.

The first individual terminal PIC11 is connected to an external-connection port electrode PMtL of the high-frequency module 10 via a transmission-side filter 12A. The port electrode PMtL is a port through which a GSM 900 transmission signal is externally supplied. The transmission-side filter 12A is a filter circuit that attenuates a second harmonic wave and a third harmonic wave of the GSM 900 transmission signal and uses the used frequency band of the GSM 900 transmission signal as a passband.

The second individual terminal PIC12 is connected to an external-connection port electrode PMtH of the high-frequency module 10 via a transmission-side filter 12B. The port electrode PMtH is a port through which a GSM 1800 transmission signal or a GAM 1900 transmission signal is externally supplied. The transmission-side filter 12B is a filter circuit that attenuates second harmonic waves and third harmonic waves of the GSM 1800 transmission signal and the GSM 1900 transmission signal and uses the used frequency bands of the GSM 1800 transmission signal and the GSM 1900 transmission signal as passbands.

The third individual terminal PIC13 is connected to one end of a SAW filter SAW1. A matching inductor L2 is connected between a transmission line via which the third individual terminal PIC13 is connected to the SAW filter SAW1 and a ground potential. The SAW filter SAW1 uses the frequency band of a GSM 900 reception signal as the passband and has a balanced-unbalanced transforming function. The other end of the SAW filter SAW1 is a balanced terminal and is connected to an external-connection port electrode PMrL of the high-frequency module 10.

The fourth individual terminal PIC14 is connected to one end of a SAW filter SAWir1 of a diplexer DIP1. A matching inductor L3 is connected between a transmission line via which the fourth individual terminal PIC14 is connected to the SAW filter SAWir1 and the ground potential. The SAW filter SAWir1 uses the frequency band of a GSM 1800 reception signal as the passband and has the balanced-unbalanced transforming function.

The fifth individual terminal PIC15 is connected to one end of a SAW filter SAWir2 of the diplexer DIP1. A matching inductor L4 is connected between a transmission line via which the fifth individual terminal PIC15 is connected to the SAW filter SAWir2 and the ground potential. The SAW filter SAWir2 uses the frequency band of a GSM 1900 reception signal as the passband and has the balanced-unbalanced transforming function.

The SAW filters SAWir1 and SAWir2 are integrally provided to define one diplexer DIP1. The SAW filters SAWir1 and SAWir2 of the diplexer DIP1 share the balanced terminal. The balanced terminal that is commonly used is connected to an external-connection port electrode PMrH of the high-frequency module 10. The GSM 1800 reception signal and the GSM 1900 reception signal are externally output through the port electrode PMrH.

The sixth individual terminal PIC16 is connected to a duplexer DUP1. A capacitor CB1 is connected between the sixth individual terminal PIC16 and the duplexer DUP1, and an inductor LB1 is connected between the duplexer DUP1 side of the capacitor CB1 and the ground potential. The capacitor CB1 and the inductor LB1 define a matching circuit.

The duplexer DUP1 includes a SAW filter SAWut1 and a SAW filter SAWur2. The SAW filter SAWut2 and the SAW filter SAWur1 are integrally provided in a signal housing. The duplexer DUP1 has two individual terminals for one common terminal.

The SAW filter SAWut1 corresponding to a transmission-side filter according to a preferred embodiment of the present invention uses the used frequency band of a WCDMA (Band 1) transmission signal as the passband. The used frequency band of a WCDMA (Band 1) reception signal is set in an attenuation band of the SAW filter SAWut1. The other end of the SAW filter SAWut1 is connected to an external-connection port electrode PMct1 of the high-frequency module 10. The port electrode PMct1 is a port through which the WCDMA (Band 1) transmission signal is externally supplied.

The SAW filter SAWur1 corresponding to a reception-side filter according to a preferred embodiment of the present invention uses the used frequency band of the WCDMA (Band 1) reception signal as the passband. The used frequency band of the WCDMA (Band 1) transmission signal is set in the attenuation band of the SAW filter SAWur1. The SAW filter SAWur1 has the balanced-unbalanced transforming function. The other end of the SAW filter SAWur1 is the balanced terminal and is connected to an external-connection port electrode PMcr1 of the high-frequency module 10. The port electrode PMcr1 is a port through which the WCDMA (Band 1) reception signal is externally output.

The seventh individual terminal PIC17 is connected to a duplexer DUP2. An inductor L5 is connected between a certain position on a transmission line between the seventh individual terminal PIC17 and the duplexer DUP2 and the ground potential. The inductor L5 defines a matching circuit.

The duplexer DUP2 preferably includes a SAW filter SAWut2 and a SAW filter SAWur2. The SAW filter SAWut2 and the SAW filter SAWur2 are integrally provided in a signal housing. The duplexer DUP2 includes two individual terminals for one common terminal.

The SAW filter SAWut2 corresponding to the transmission-side filter according to a preferred embodiment of the present invention uses the used frequency band of a WCDMA (Band 5) transmission signal as the passband. The used frequency band of a WCDMA (Band 5) reception signal is set in the attenuation band of the SAW filter SAWut2. The other end of the SAW filter SAWut2 is connected to an external-connection port electrode PMct2 of the high-frequency module 10. The port electrode PMct2 is a port through which the WCDMA (Band 5) transmission signal is externally supplied.

The SAW filter SAWur2 corresponding to the reception-side filter according to a preferred embodiment of the present invention uses the used frequency band of the WCDMA (Band 5) reception signal as the passband. The used frequency band of the WCDMA (Band 5) transmission signal is set in the attenuation band of the SAW filter SAWur2. The SAW filter SAWur2 has the balanced-unbalanced transforming function. The other end of the SAW filter SAWur2 is the balanced terminal and is connected to an external-connection port electrode PMcr2 of the high-frequency module 10. The port electrode PMcr2 is a port through which the WCDMA (Band 5) reception signal is externally output.

The eighth individual terminal PIC18 is connected to a duplexer DUP3. An inductor L6 is connected between a certain position on a transmission line between the eighth individual terminal PIC18 and the duplexer DUP3 and the ground potential. The inductor L6 defines a matching circuit.

The duplexer DUP3 preferably includes a SAW filter SAWut3 and a SAW filter SAWur3. The SAW filter SAWut3 and the SAW filter SAWur3 are integrally provided in a signal housing. The duplexer DUP3 includes two individual terminals for one common terminal.

The SAW filter SAWut3 corresponding to the transmission-side filter according to a preferred embodiment of the present invention uses the used frequency band of a WCDMA (Band 2) transmission signal as the passband. The used frequency band of a WCDMA (Band 2) reception signal is set in the attenuation band of the SAW filter SAWut3. The other end of the SAW filter SAWut3 is connected to an external-connection port electrode PMct3 of the high-frequency module 10. The port electrode PMct3 is a port through which the WCDMA (Band 2) transmission signal is externally supplied.

The SAW filter SAWur3 corresponding to the reception-side filter according to a preferred embodiment of the present invention uses the used frequency band of the WCDMA (Band 2) reception signal as the passband. The used frequency band of the WCDMA (Band 2) transmission signal is set in the attenuation band of the SAW filter SAWur3. The SAW filter SAWur3 has the balanced-unbalanced transforming function. The other end of the SAW filter SAWur3 is the balanced terminal and is connected to an external-connection port electrode PMcr3 of the high-frequency module 10. The port electrode PMcr3 is a port through which the WCDMA (Band 2) reception signal is externally output.

The frequency band of each communication signal processed in the high-frequency module 10 of the present preferred embodiment will now be described with reference to FIG. 2. FIG. 2 is a table indicating a list of the transmission frequency bands and the reception frequency bands of the respective communication signals. Although only the frequency bands of the communication signals used for the description in the present preferred embodiment and each preferred embodiment described below are indicated and the frequency bands of other communication signals are omitted in FIG. 2, the high-frequency module of various preferred embodiments of the present invention may be used according to the concept of the present invention.

A minimum frequency within the used frequency band of the GSM 900 transmission signal is 880 MHz, a maximum frequency thereof is 915 MHz, and a center frequency thereof is 897.5 MHz. The minimum frequency within the used frequency band of the GSM 900 reception signal is 925 MHz, the maximum frequency thereof is 960 MHz, and the center frequency thereof is 942.5 MHz.

The minimum frequency within the used frequency band of the GSM 1800 transmission signal is 1,710 MHz, the maximum frequency thereof is 1,785 MHz, and the center frequency thereof is 1,747.5 MHz. The minimum frequency within the used frequency band of the GSM 1800 reception signal is 1,805 MHz, the maximum frequency thereof is 1,880 MHz, and the center frequency thereof is 1,842.5 MHz.

The minimum frequency within the used frequency band of the GSM 1900 transmission signal is 1,850 MHz, the maximum frequency thereof is 1,910 MHz, and the center frequency thereof is 1,880 MHz. The minimum frequency within the used frequency band of the GSM 1900 reception signal is 1,930 MHz, the maximum frequency thereof is 1,990 MHz, and the center frequency thereof is 1,960 MHz.

The minimum frequency within the used frequency band of the WCDMA (Band 1) transmission signal is 1,920 MHz, the maximum frequency thereof is 1,980 MHz, and the center frequency thereof is 1,950 MHz. The minimum frequency within the used frequency band of the WCDMA (Band 1) reception signal is 2,110 MHz, the maximum frequency thereof is 2,170 MHz, and the center frequency thereof is 2,140 MHz.

The minimum frequency within the used frequency band of the WCDMA (Band 2) transmission signal is 1,850 MHz, the maximum frequency thereof is 1,910 MHz, and the center frequency thereof is 1,880 MHz. The minimum frequency within the used frequency band of the WCDMA (Band 2) reception signal is 1,930 MHz, the maximum frequency thereof is 1,990 MHz, and the center frequency thereof is 1,960 MHz.

The minimum frequency within the used frequency band of the WCDMA (Band 5) transmission signal is 824 MHz, the maximum frequency thereof is 849 MHz, and the center frequency thereof is 836.5 MHz. The minimum frequency within the used frequency band of the WCDMA (Band 5) reception signal is 869 MHz, the maximum frequency thereof is 894 MHz, and the center frequency thereof is 881.5 MHz.

The minimum frequency within the used frequency band of a WCDMA (Band 7) transmission signal is 2,500 MHz, the maximum frequency thereof is 2,570 MHz, and the center frequency thereof is 2,535 MHz. The minimum frequency within the used frequency band of a WCDMA (Band 7) reception signal is 2,620 MHz, the maximum frequency thereof is 2,690 MHz, and the center frequency thereof is 2,655 MHz.

In various preferred embodiments of the present invention, the difference between the frequency bands indicates the difference between the maximum frequency within the used frequency band of a communication signal the central frequency of which is at a lower frequency side and the minimum frequency within the used frequency band of a communication signal the center frequency of which is at a higher frequency side. The difference between the frequency bands when the used frequency bands are overlapped with each other is defined as "zero" in various preferred embodiments of the present invention.

Under the above concept, in the WCDMA communication signals, the WCDMA (Band 1) frequency band is close to the WCDMA (Band 2) frequency band. For example, the difference between the minimum frequency (1,920 MHz) within the used frequency band of the WCDMA (Band 1) transmission signal and the maximum frequency (1,910 MHz) within the used frequency band of the WCDMA (Band 2) transmission signal is only 10 MHz.

The used frequency band (from 1,920 MHz to 1,980 MHz) of the WCDMA (Band 1) transmission signal is overlapped with the used frequency band (from 1,930 MHz to 1,990 MHz) of the WCDMA (Band 2) reception signal at most frequencies (the difference between the used frequency band of the WCDMA (Band 1) transmission signal and the used frequency band of the WCDMA (Band 2) reception signal is "zero").

The high-frequency module 10 is realized in the following structure in the present preferred embodiment in order to transmit and receive communication signals of three or more types including communication signals of two types the used frequency bands of which are close to each other or are partially overlapped with each other (the difference is "zero").

FIGS. 3A and 3B are diagrams for describing the structure of the high-frequency module 10 according to the present preferred embodiment. FIG. 3A is an external perspective view and FIG. 3B is a layout diagram of a top surface.

The high-frequency module 10 includes a multilayer body 900 and circuit elements described below mounted on the top surface of the multilayer body 900.

The multilayer body 900 includes a certain number of dielectric layers that are stacked and has inner layer electrodes provided therein. The dielectric layers and the inner layer electrodes realize electrode patterns of the high-frequency module 10. The external-connection port electrodes described above are formed in a certain arrangement on a bottom surface of the multilayer body 900 although not illustrated in detail in the present preferred embodiment.

The circuit elements mounted on the top surface of the multilayer body 900 include the switching element SWIC, the SAW filter SAW1, the diplexer DIP1, the duplexers DUP1, DUP2, and DUP3, the circuit elements connected to power supply lines to the switching element SWIC, and the inductors, etc. defining the above matching circuits.

The duplexer DUP1 includes the SAW filters SAWut1 and SAWur1, which are surface acoustic wave filters and which are integrally formed in the single housing. The SAW filter SAWut1 uses the WCDMA (Band 1) transmission frequency band as the passband and uses another frequency band as the attenuation band. The SAW filter SAWur1 uses the WCDMA (Band 1) reception frequency band as the passband and uses another frequency band as the attenuation band.

The duplexer DUP2 includes the SAW filters SAWut2 and SAWur2, which are surface acoustic wave filters and which are integrally provided in the single housing. The SAW filter SAWut2 uses the WCDMA (Band 5) transmission frequency band as the passband and uses another frequency band as the attenuation band. The SAW filter SAWur2 uses the WCDMA (Band 5) reception frequency band as the passband and uses another frequency band as the attenuation band.

The duplexer DUP3 includes the SAW filters SAWut3 and SAWur3, which are surface acoustic wave filters and which are integrally provided in the single housing. The SAW filter SAWut3 uses the WCDMA (Band 2) transmission frequency band as the passband and uses another frequency band as the attenuation band. The SAW filter SAWur3 uses the WCDMA (Band 2) reception frequency band as the passband and uses another frequency band as the attenuation band.

The duplexers DUP1, DUP2, and DUP3 are mounted in a state in which the duplexers DUP1, DUP2, and DUP3 are aligned at certain intervals along a first side in a plan view of the multilayer body 900 (a left side on the page in FIG. 3B). The mounting positions are appropriately set on the basis of, for example, the arrangement pattern of the external-connection port electrodes on the bottom surface so that the switching element SWIC, the SAW filter SAW1, the diplexer DIP1, the other circuit elements, and the circuit pattern in FIG. 1 are realized and the size of the multilayer body 900 in a plan view is minimized.

The duplexer DUP2 that transmits and receives the WCDMA (Band 5) communication signals is arranged between the duplexer DUP1 that transmits and receives the WCDMA (Band 1) communication signals and the duplexer DUP3 that transmits and receives the WCDMA (Band 2) communication signals.

The above arrangement pattern causes the spacing between the duplexers DUP1 and DUP3 transmitting and receiving the WCDMA (Band 1) communication signals and the WCDMA (Band 2) communication signals, respectively, the used frequency bands of which are close to each other or are partially overlapped with each other, to be larger than the spacing corresponding to the shape of the duplexer DUP2. In addition, the duplexer DUP2 exists between the duplexers DUP1 and DUP3. This suppresses or prevents electromagnetic field coupling and electrostatic coupling between the duplexers DUP1 and DUP3. Accordingly, for example, a problem is not caused in which the WCDMA (Band 1) transmission signal passing through the duplexer DUP1 leaks into the downstream reception circuit via the duplexer DUP3 and the SAW filter SAWur3 of the duplexer DUP3. In other words, it is possible to increase the isolation between the transmission paths of the two communication signals the frequency bands of which are close to each other or are partially overlapped with each other.

For example, the duplexer DUP1 is close to the duplexer DUP2 and the duplexer DUP3 is close to the duplexer DUP2 while the used frequency bands of the WCDMA (Band 1) communication signals and the WCDMA (Band 2) communication signals transmitting through the duplexers DUP1 and DUP3, respectively, are spaced apart from the used frequency band of the WCDMA (Band 5) communication signals transmitting through the duplexer DUP2. Specifically, as described above, the used frequency bands of the WCDMA (Band 1) communication signals and the WCDMA (Band 2) communication signals are from about 1,800 MHz to about 2,200 MHz while the used frequency band of the WCDMA (Band 5) communication signals is from about 820 MHz to about 900 MHz. Even if a signal from the duplexer DUP1 or DUP3 leaks into the duplexer DUP2, the signal is attenuated in the duplexer DUP2. Similarly, even if a signal from the duplexer DUP2 leaks into the duplexer DUP1 or DUP3, the signal is attenuated in the duplexer DUP1 or DUP3. Accordingly, as described above, the problem does not occur, which is caused when the duplexers DUP1 and DUP3 through which the two types of communication signals having the frequency bands that are close to each other or are partially overlapped with each other are transmitted are closely arranged.

As described above, with the structure of the present preferred embodiment, it is possible to realize the high-frequency module 10 that is compact but has excellent isolation characteristics between the respective communication signals even when the communication signals of three or more types including the communication signals of two types the frequency bands of which are close to each other or are partially overlapped with each other are transmitted and received.

Figure 4:
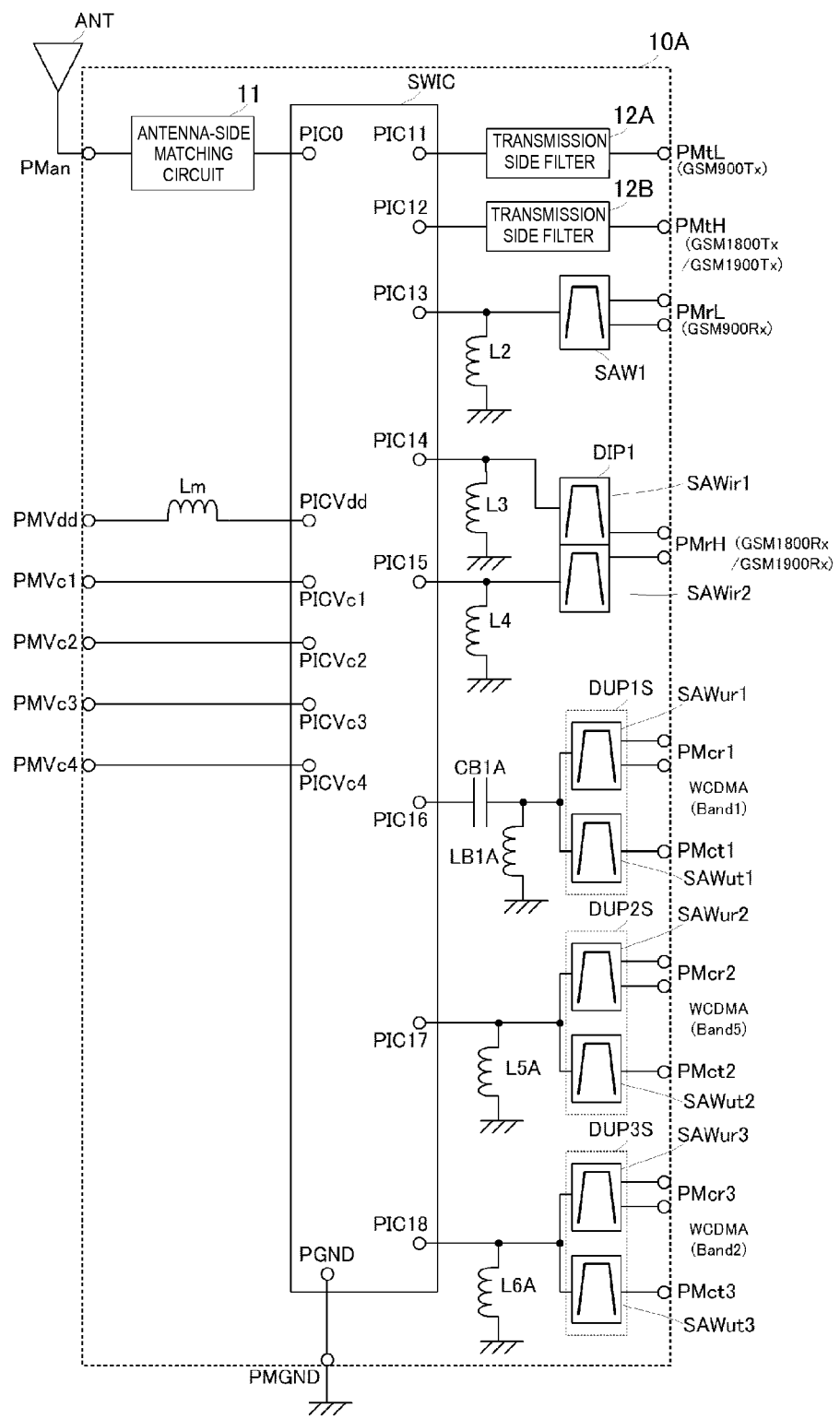
FIG. 4 is a block diagram illustrating a circuit configuration of a high-frequency module 10A according to a second preferred embodiment of the present invention.

A high-frequency module according to a second preferred embodiment will now be described with reference to the drawings. FIG. 4 is a block diagram illustrating a circuit configuration of a high-frequency module 10A according to the present preferred embodiment.

The high-frequency module 10A of the present preferred embodiment has the circuit configuration in which resistors R1 to R4 on the power supply lines illustrated in the first preferred embodiment are omitted or are realized with only the resistance components on the transmission lines. The SAW filters SAWut1 and SAWur1 of the duplexer DUP1S, the SAW filters SAWut2 and SAWur2 of the duplexer DUP2S, and the SAW filters SAWut3 and SAWur3 of the duplexer DUP3S are preferably provided in separate housings. Since the remaining configuration is the same as that of the first preferred embodiment, a detailed description of the circuit configuration is omitted herein except for modified portions.

The sixth individual terminal PIC16 is connected to a duplexer DUP1S. A capacitor CB1A is connected between the sixth individual terminal PIC16 and the duplexer DUP1S and an inductor LB1A is connected between the duplexer DUP1S side of the capacitor CB1A and the ground potential. The capacitor CB1A and the inductor LB1A define a matching circuit.

The duplexer DUP1S includes the SAW filter SAWut1 and the SAW filter SAWur1. The sixth individual terminal PIC16 is connected to both one end of the SAW filter SAWut1 and one end of SAW filter SAWur1.

The seventh individual terminal PIC17 is connected to a duplexer DUP2S. A matching inductor L5A is connected between a transmission line between the seventh individual terminal PIC17 and the duplexer DUP2S and the ground potential.

The duplexer DUP2S includes the SAW filter SAWut2 and the SAW filter SAWur2. The seventh individual terminal PIC17 is connected to both one end of the SAW filter SAWut2 and one end of the SAW filter SAWur2.

The eighth individual terminal PIC18 is connected to a duplexer DUP3S. A matching inductor L6A is connected between a transmission line between the eighth individual terminal PIC18 and the duplexer DUP3S and the ground potential.

The duplexer DUP3S includes the SAW filter SAWut3 and the SAW filter SAWur3. The eighth individual terminal PIC18 is connected to both one end of the SAW filter SAWut3 and one end of the SAW filter SAWur3.

Figure 5A:
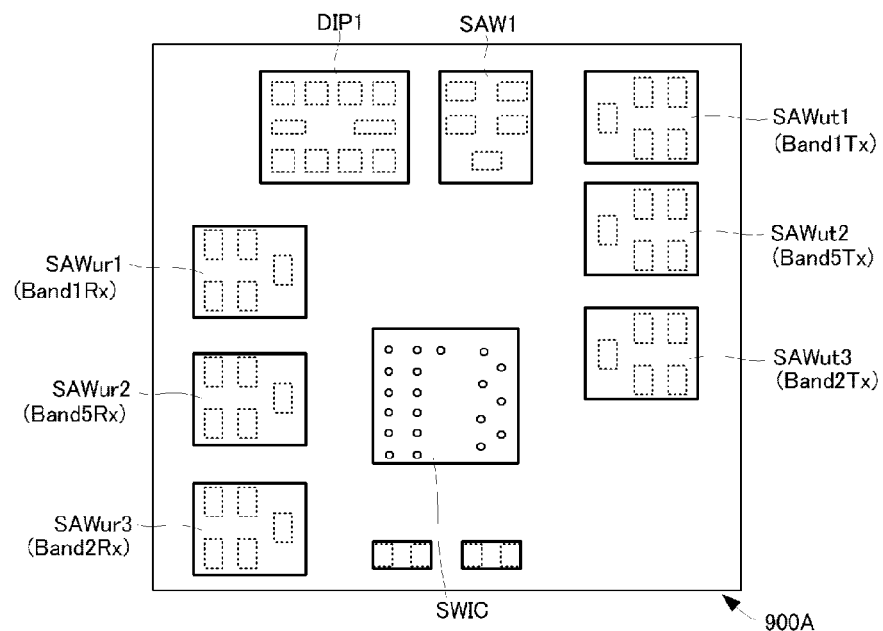
FIGS. 5A and 5B are diagrams for describing the structure of the high-frequency module 10A according to the second preferred embodiment of the present invention.
Figure 5B:
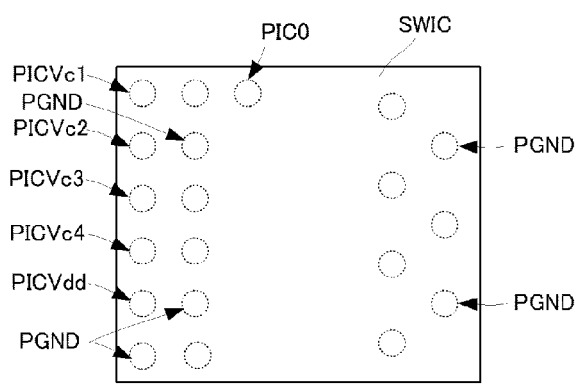

FIGS. 5A and 5B are diagrams for describing the structure of the high-frequency module 10A according to the present preferred embodiment. FIG. 5A is a layout diagram of the top surface and FIG. 5B illustrates a land pattern of the switching element SWIC.

The circuit elements mounted on the top surface of a multilayer body 900A include the switching element SWIC, the SAW filter SAW1, the diplexer DIP1, the SAW filters SAWut1 and SAWu1 of the duplexer DUP1S, the SAW filters SAWut2 and SAWur2 of the duplexer DUP2S, and the SAW filters SAWut3 and SAWur3 of the duplexer DUP3S.

The SAW filters SAWut1 and SAWur1 of the duplexer DUP1S are the circuit elements realized in separate housings. Similarly, the SAW filters SAWut2 and SAWur2 of the duplexer DUP2S are also the circuit elements realized in separate housings. The SAW filters SAWut3 and SAWur3 of the duplexer DUP3S are also the circuit elements realized in separate housings.

The SAW filter SAWut1 of the duplexer DUP1S, the SAW filter SAWut2 of the duplexer DUP2S, and the SAW filter SAWut3 of the duplexer DUP3S are mounted along a second side in a plan view of the multilayer body 900A (a right side on the page in FIG. 5A) near the second side.

The SAW filter SAWut2 for the WCDMA (band 5) communication signals the frequency band of which is spaced apart from the frequency bands of the WCDMA (band 1) communication signals and the WCDMA (Band 2) communication signals is arranged between the SAW filters SAWut1 and SAWut3 for the WCDMA (band 1) communication signals and the WCDMA (Band 2) communication signals, respectively, the frequency bands of the transmission signals of which are close to each other. This arrangement allows the isolation between a WCDMA (band 1) transmission system circuit and a WCDMA (Band 2) transmission system circuit, which are likely to be mutually affected, to be increased.

The SAW filter SAWur1 of the duplexer DUP1S, the SAW filter SAWur2 of the duplexer DUP2S, and the SAW filter SAWur3 of the duplexer DUP3S are mounted along the first side opposing the second side in a plan view of the multilayer body 900A (the left side on the page in FIG. 5A) near the first side.

The SAW filter SAWur2 for the WCDMA (Band 5) communication signals the frequency band of which is spaced apart from the frequency bands of the WCDMA (Band 1) communication signals and the WCDMA (Band 2) communication signals is arranged between the SAW filters SAWur1 and SAWur3 for the WCDMA (Band 1) communication signals and the WCDMA (Band 2) communication signals, respectively, the frequency bands of the reception signals of which are close to each other. This arrangement allows the isolation between a WCDMA (Band 1) reception system circuit and a WCDMA (Band 2) reception system circuit, which are likely to be mutually affected, to be increased.

In addition, the SAW filters SAWut1, SAWut2, and SAWut3 at the transmission side are spaced apart from the SAW filters SAWur1, SAWur2, and SAWur3 at the reception side.

With the above structure, it is possible to suppress or prevent unnecessary electromagnetic field coupling between the SAW filters SAWut1 and SAWur1 to improve the isolation. In other words, it is possible to improve the features as the duplexer DUP1S without the high-power WCDMA (Band 1) transmission signal leaking into the SAW filter SAWur1 side.

Similarly, the SAW filters SAWut2 and the SAW filter SAWur2, which define the duplexer DUP2S, are spaced apart from each other and the SAW filter SAWut3 and the SAW filter SAWur3, which define the duplexer DUP3S, are spaced apart from each other. With the above structure, it is possible to suppress or prevent unnecessary electromagnetic field coupling between the SAW filters SAWut2 and SAWur2 and between the SAW filters SAWut3 and SAWur3 to improve the isolation. In other words, it is possible to improve the features as the duplexer DUP2S without the high-power WCDMA (Band 5) transmission signal leaking into the SAW filter SAWur2 side. In addition, it is possible to improve the features as the duplexer DUP3S without the high-power WCDMA (Band 2) transmission signal leaking into the SAW filter SAWur3 side.

Furthermore, the switching element SWIC is mounted at a central portion in a plan view of the multilayer body 900A. In other words, the switching element SWIC is mounted between a mounting area of the SAW filter SAWut1, the SAW filter SAWut2, and the SAW filter SAWut3 of the duplexers DUP1S, DUP2S, and DUP3S, respectively, and a mounting area of the SAW filter SAWur1, the SAW filter SAWur2, and the SAW filter SAWur3 of the duplexers DUP1S, DUP2S, and DUP3S, respectively.

With this structure, it is possible to further suppress or prevent the unnecessary electromagnetic coupling and electrostatic coupling between the SAW filters SAWut1 and SAWur1 of the duplexer DUP1S. Similarly, it is possible to further suppress or prevent the unnecessary electromagnetic coupling and electrostatic coupling between the SAW filters SAWut2 and SAWur2 of the duplexer DUP2S and the unnecessary electromagnetic field coupling between the SAW filters SAWut3 and SAWur3 of the duplexer DUP3S.

The switching element SWIC is mounted on the multilayer body 900A so that an electrical power system terminal group including the drive voltage application terminal PICVdd and the multiple control voltage application terminals PICVc1, PICVc2, PICVc3, and PICVc4 is at the side of the SAW filters SAWur1, SAWur2, and SAWur3, which are the reception-side filters, as illustrated in FIGS. 5A and 5B. In other words, the switching element SWIC is mounted on the multilayer body 900A so that the electrical power system terminal group is at a side opposite to the side of the SAW filters SAWut1, SAWut2, and SAWut3, which are the transmission-side filters.

With the above structure, since the SAW filters SAWut1, SAWut2, and SAWut3, which are the transmission-side filters, are spaced apart from the electrical power system terminal group, the high isolation can be ensured between the SAW filters SAWut1, SAWut2, and SAWut3 and the electrical power system terminal group. Accordingly, it is possible to suppress or prevent leakage of the high-power transmission signals from the SAW filters SAWut1, SAWut2, and SAWut3, which are the transmission-side filters, to be superimposed on the drive voltage and the control voltage to be supplied to the electrical power system terminal group. As a result, it is possible to improve the switch characteristics, such as harmonic characteristics, of the switching element SWIC.

Furthermore, the use of the configuration of the present preferred embodiment allows the outlines of the SAW filters SAWut1, SAWut2, and SAWut3, which are the transmission-side filters, and the SAW filters SAWur1, SAWur2, and SAWur3, which are the reception-side filters, to be reduced in size, compared with the duplexer in the related art in which the transmission-side filters are integrated with the reception-side filters. Accordingly, the degree of freedom of arrangement when the respective circuit elements are mounted on the high-frequency module 10A is improved, so as to more reliably and easily reduce the size of the high-frequency module 10A.

Although the diplexer DIP1 and the SAW filter SAW1 preferably are mounted along another side that is perpendicular or substantially perpendicular to the first side and the second side described above in the present preferred embodiment, the diplexer DIP1 and the SAW filter SAW1 may be arranged at other positions according to the specifications.

Figure 6:
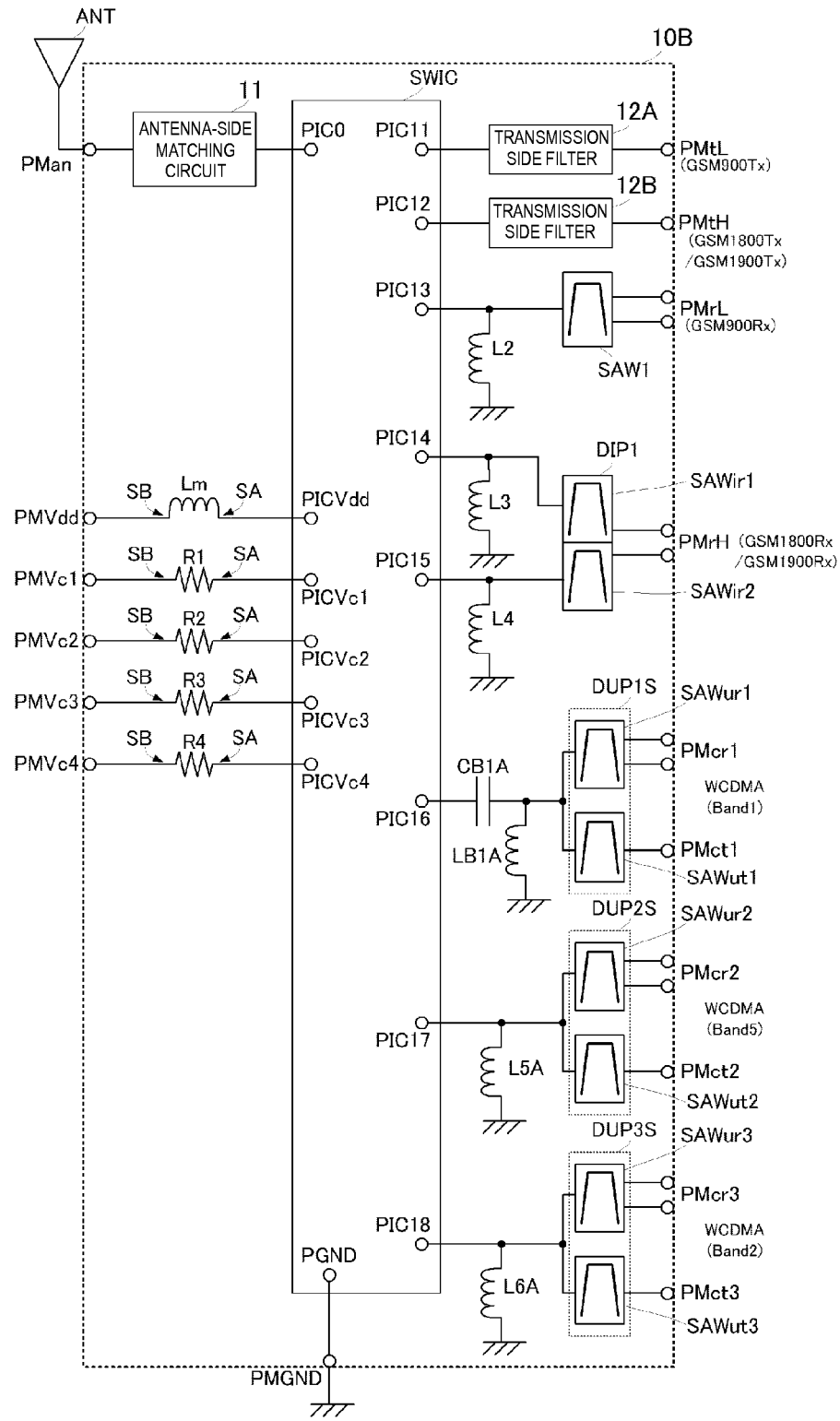
FIG. 6 is a block diagram illustrating a circuit configuration of a high-frequency module 10B according to a third preferred embodiment of the present invention.

A high-frequency module according to a third preferred embodiment of the present invention will now be described with reference to the drawings. FIG. 6 is a block diagram illustrating a circuit configuration of a high-frequency module 10B according to the present preferred embodiment. As illustrated in FIG. 6, the high-frequency module 10B of the present preferred embodiment results from only addition of a noise suppression inductor Lm and the resistors R1, R2, R3, and R4 to the electrical power system circuit of the switching element SWIC in the high-frequency module 10A illustrated in the second preferred embodiment (has the same configuration as that of the first preferred embodiment) and the remaining circuit configuration is the same as that of the second preferred embodiment. Accordingly, a description of the circuit configuration of the high-frequency module 10B is omitted herein.

Figure 7A:
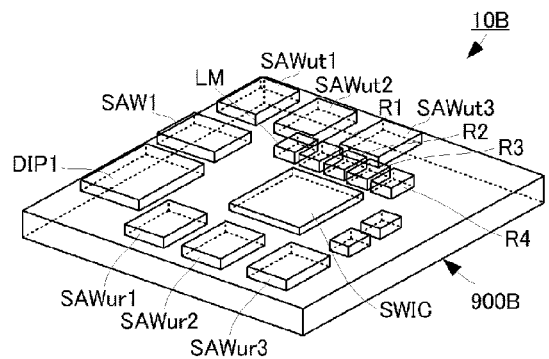
FIGS. 7A and 7B are diagrams for describing the structure of the high-frequency module 10B according to the third preferred embodiment of the present invention.
Figure 7B:
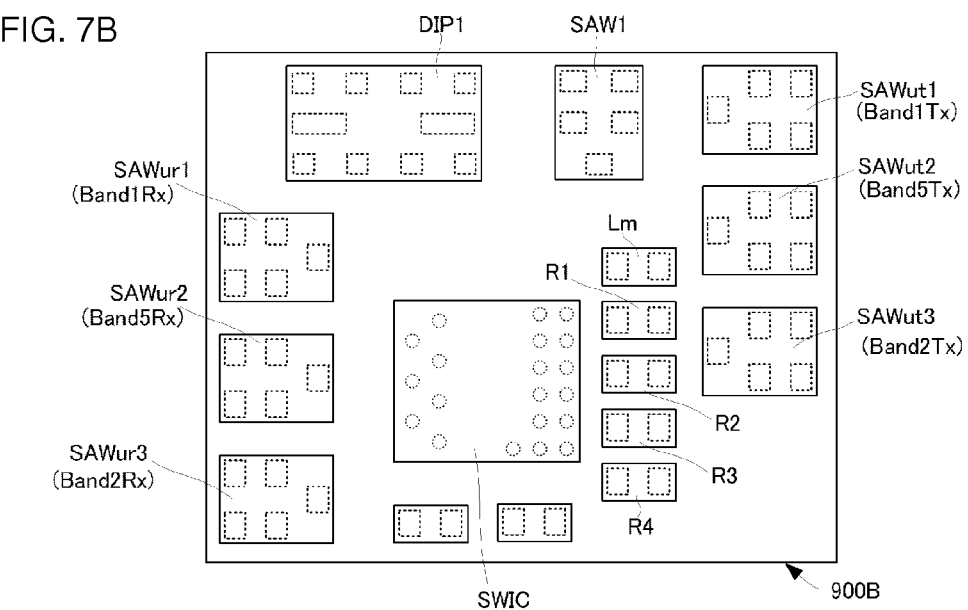
Figure 8:
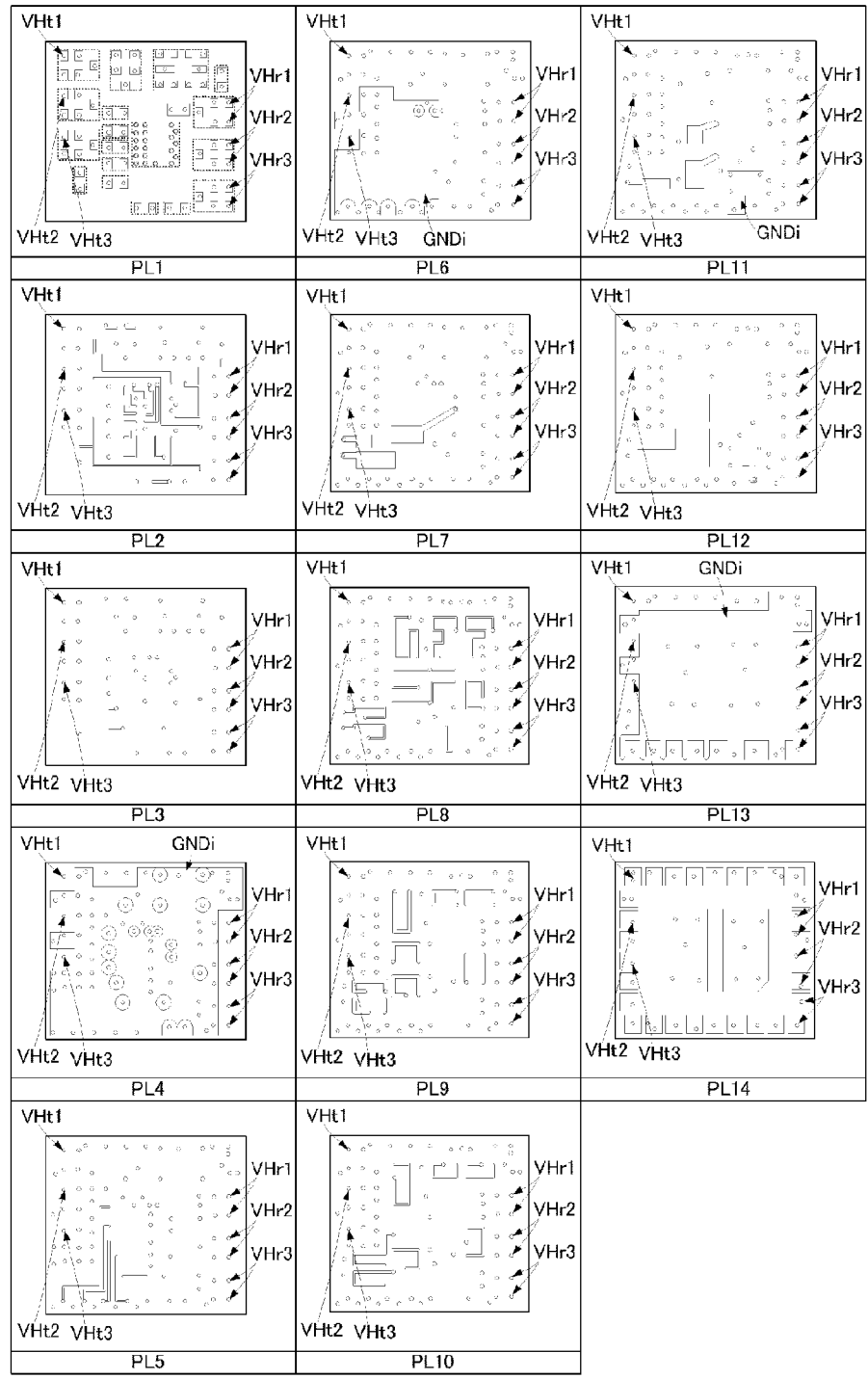
FIG. 8 is a stack diagram of the high-frequency module 10B of the third preferred embodiment of the present invention.
Figure 9A:
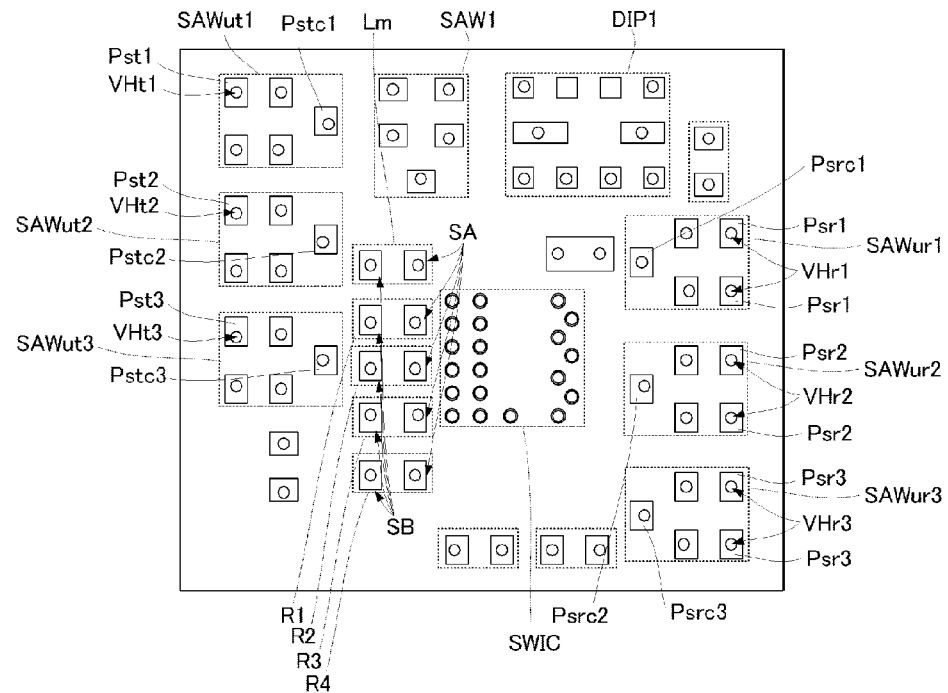
FIGS. 9A and 9B include a mounting state diagram of a top layer of a multilayer body 900B of the high-frequency module 10B of the third preferred embodiment of the present invention and a diagram illustrating an alignment pattern of external-connection port electrodes on a bottom layer.
Figure 9B:
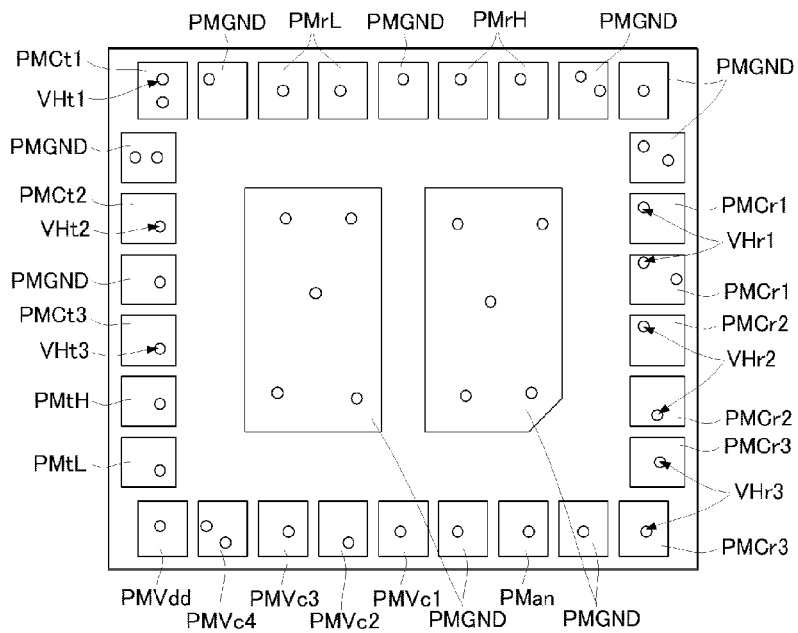

The high-frequency module 10B has the following structure. FIGS. 7A and 7B are diagrams for describing the structure of the high-frequency module 10B according to the present preferred embodiment. FIG. 7A is an external perspective view and FIG. 7B is a layout diagram of the top surface. FIG. 8 is a stack diagram of the high-frequency module 10B of the present preferred embodiment. FIG. 8 illustrates electrode patterns of the dielectric layers of a multilayer body 900B, viewed from the bottom side. FIG. 9A is a mounting state diagram of the top layer of the multilayer body 900B of the high-frequency module 10B of the present preferred embodiment. FIG. 9B is a diagram illustrating an alignment pattern of the external-connection port electrodes on the bottom layer.

The switching element SWIC, the SAW filter SAW1, the diplexer DIP1, the SAW filters SAWut1 and SAWur1 of the duplexer DUP1, the SAW filters SAWut2 and SAWur2 of the duplexer DUP2, the SAW filters SAWut3 and SAWur3 of the duplexer DUP3, and the circuit elements of the matching circuits are mounted on the top layer of the multilayer body 900B, as in the high-frequency module 10A of the second preferred embodiment.

In addition, in the high-frequency module 10B, the inductor Lm and the resistors R1, R2, R3, and R4 described above are mounted on the top layer of the multilayer body 900B. The inductor Lm and the resistors R1, R2, R3, and R4 are arranged and mounted between the mounting position of the switching element SWIC and the mounting area of the SAW filter SAWut1, the SAW filter SAWut2, and the SAW filter SAWut3, which are the transmission-side filters, in a plan view of the multilayer body 900B.

With the above configuration, it is possible to further improve the isolation between the SAW filter SAWut1, the SAW filter SAWut2, and the SAW filter SAWut3, which are the transmission-side filters, and the SAW filter SAWur1, the SAW filter SAWur2, and the SAW filter SAWur3, which are the reception-side filters. It is also possible to further improve the isolation between the SAW filter SAWut1, the SAW filter SAWut2, and the SAW filter SAWut3, which are the transmission-side filters, and the switching element SWIC.

As illustrated in FIG. 7B and FIG. 9A, the switching element SWIC can ensure the isolation due to the presence of the inductor Lm and the resistors R1, R2, R3, and R4 existing between the switching element SWIC and the transmission-side filters even when the power system terminal group includes the SAW filter SAWut1, the SAW filter SAWut2, and the SAW filter SAWut3 side, which are the transmission-side filters, so as to suppress or prevent the superimposition of the transmission signal on the drive voltage and the control voltage.

Furthermore, the inductor Lm and the resistors R1, R2, R3, and R4 are mounted so that the terminals at the side at which the inductor Lm and the resistors R1, R2, R3, and R4 are connected to the external-connection port electrodes (at an "SB" side in FIG. 6 and FIGS. 9A and 9B), face the mounting area side of the transmission-side filters, as illustrated in FIG. 6 and FIGS. 9A and 9B. This allows the isolation to be more reliably improved to suppress or prevent the superimposition of the transmission signal on the drive voltage and the control voltage.

The internal structure of the multilayer body 900B, the mounting pattern of the top surface of the multilayer body 900B, and the alignment pattern of the external-connection port electrodes on the bottom surface of the multilayer body 900B will now be described with reference to FIG. 8 and FIGS. 9A and 9B.

The multilayer body 900B preferably includes fourteen dielectric layers stacked therein, for example. A certain electrode pattern of the high-frequency module 10B and via electrodes connecting the layers are provided on each dielectric layer. The via electrodes are represented by circles on each layer in FIG. 8. In the following description, the top layer is referred to as a first layer and the bottom layer is referred to as a fourteenth layer. The lower layers have the larger layer numbers.

The element mounting electrodes used to mount the circuit elements are provided on the top surface of the first layer, which is the top layer, that is, on the top surface of the multilayer body 900B, as described above.

Wiring pattern electrodes are provided on the second layer and the third layer. An internal layer ground electrode GNDi is provided substantially over the fourth layer. Wiring electrodes are formed on the fifth layer. The internal layer ground electrode GNDi is provided in a certain area on the sixth layer.

Electrode patterns for the inductors and electrode patterns for the capacitors of the transmission-side filters 12A and 12B and the antenna-side matching circuit 11 are provided on the seventh layer, the eighth layer, the ninth layer, the tenth layer, the eleventh layer, and the twelfth layer.

The internal layer ground electrode GNDi is provided substantially over the thirteenth layer.

The external-connection port electrodes are aligned and provided on the bottom surface of the fourteenth layer, which is the bottom layer, that is, on the bottom surface of the multilayer body 900B. As illustrated in FIGS. 9A and 9B, a first transmission signal input port electrode PMct1, a second transmission signal input port electrode PMct2, a third transmission signal input port electrode PMct3, a GSM 1800 and GSM 1900 transmission signal input port electrode PMtH, and a GSM 900 transmission signal input port electrode PMtL are aligned and arranged along the second side of the fourteenth layer corresponding to the second side at the side where the SAW filters SAWut1, SAWut2, and SAWut3, which are the transmission-side filters, are mounted.

The first transmission signal input port electrode PMct1 and a transmission signal input terminal mounting electrode Pst1 of the SAW filter SAWut1 are formed so as to be at least partially overlapped with each other in a plan view of the multilayer body 900B. The port electrode PMct1 is connected to the mounting electrode Pst1 only via a via electrode VHt1. This configuration causes the port electrode PMct1 to be connected to the mounting electrode Pst1 at a shortest distance along the stacking direction and, thus, it is difficult for the unnecessary electromagnetic field coupling to occur for the other circuit elements.

The second transmission signal input port electrode PMct2 and a transmission signal input terminal mounting electrode Pst2 of the SAW filter SAWut2 are arranged so as to be at least partially overlapped with each other in a plan view of the multilayer body 900B. The port electrode PMct2 is connected to the mounting electrode Pst2 only via a via electrode VHt2. This configuration causes the port electrode PMct2 to be connected to the mounting electrode Pst2 at a shortest distance along the stacking direction and, thus, it is difficult for the unnecessary electromagnetic field coupling to occur for the other circuit elements.

The third transmission signal input port electrode PMct3 and a transmission signal input terminal mounting electrode Pst3 of the SAW filter SAWut3 are arranged so as to be at least partially overlapped with each other in a plan view of the multilayer body 900B. The port electrode PMct3 is connected to the mounting electrode Pst3 only via a via electrode VHt3. This configuration causes the port electrode PMct3 to be connected to the mounting electrode Pst3 at a shortest distance along the stacking direction and, thus, it is difficult for the unnecessary electromagnetic field coupling to occur for the other circuit elements.

Although the via electrodes VHt1, VHt2, and VHt3 preferably are relatively close to each other and are parallel or substantially parallel to each other, the unnecessary electromagnetic field coupling between the via electrodes VHt1, VHt2, and VHt3 is also suppressed or prevented because the internal layer ground electrode GNDi exists between the via electrodes, as illustrated in the fourth layer and the thirteenth layer in FIG. 8.

Since the via electrodes for the WCDMA (Band 5) communication signals the frequency band of which is spaced apart from those of the WCDMA (Band 1) communication signals and the WCDMA (Band 2) communication signals exist between the via electrodes for the WCDMA (Band 1) communication signals and the via electrodes for the WCDMA (Band 2) communication signals the frequency bands of which are close to each other, the isolation at the via electrodes in the transmission signal system is improved.

First reception signal output port electrodes PMcr1, second reception signal output port electrodes PMcr2, and third reception signal output port electrodes PMcr3 are aligned and arranged along the other side of the fourteenth layer corresponding to the other side at the side where the SAW filters SAWur1, SAWur2, and SAWur3, which are the reception-side filters, are mounted.

The first reception signal output port electrodes PMcr1 and reception signal output terminal mounting electrodes Psr1 of the SAW filter SAWur1 are arranged so as to be at least partially overlapped with each other in a plan view of the multilayer body 900B. The port electrodes PMcr1 are connected to the mounting electrodes Psr1 only via electrodes VHr1. This configuration causes the port electrodes PMcr1 to be connected to the mounting electrodes Psr1 at a shortest distance along the stacking direction and, thus, it is difficult for the unnecessary electromagnetic coupling and electrostatic coupling to occur for the other circuit elements. A combination of this configuration with the configuration in which the port electrode PMct1 provided for the WCDMA (Band 1) transmission signal is connected to the mounting electrode Pst1 only via the via electrode VHt1 described above allows the WCDMA (Band 1) transmission system circuit to be greatly spaced apart from the WCDMA (Band 1) reception system circuit to more reliably suppress or prevent the unnecessary electromagnetic field coupling. Accordingly, it is possible to realize the high isolation between the WCDMA (Band 1) transmission system circuit and the WCDMA (Band 1) reception system circuit.

The second reception signal output port electrodes PMcr2 and reception signal output terminal mounting electrodes Psr2 of the SAW filter SAWur2 are arranged so as to be at least partially overlapped with each other in a plan view of the multilayer body 900B. The port electrodes PMcr2 are connected to the mounting electrodes Psr2 only via via electrodes VHr2. This configuration causes the port electrodes PMcr2 to be connected to the mounting electrodes Psr2 at a shortest distance along the stacking direction and, thus, it is difficult for the unnecessary electromagnetic field coupling to occur for the other circuit elements. A combination of this configuration with the configuration in which the port electrode PMct2 provided for the WCDMA (Band 5) transmission signal is connected to the mounting electrode Pst2 only via the via electrode VHt2 described above allows the WCDMA (Band 5) transmission system circuit to be greatly spaced apart from the WCDMA (Band 5) reception system circuit to more reliably suppress or prevent the unnecessary electromagnetic field coupling. Accordingly, it is possible to realize the high isolation between the WCDMA (Band 5) transmission system circuit and the WCDMA (Band 5) reception system circuit.

The third reception signal output port electrodes PMcr3 and reception signal output terminal mounting electrodes Psr3 of the SAW filter SAWur3 are arranged so as to be at least partially overlapped with each other in a plan view of the multilayer body 900B. The port electrodes PMcr3 are connected to the mounting electrodes Psr3 only via via electrodes VHr3. This configuration causes the port electrodes PMcr3 to be connected to the mounting electrodes Psr3 at a shortest distance along the stacking direction and, thus, it is difficult for the unnecessary electromagnetic field coupling to occur for the other circuit elements. A combination of this configuration with the configuration in which the port electrode PMct3 provided for the WCDMA (Band 2) transmission signal is connected to the mounting electrode Pst3 only via the via electrode VHt3 described above allows the WCDMA (Band 2) transmission system circuit to be greatly spaced apart from the WCDMA (Band 2) reception system circuit to more reliably suppress or prevent the unnecessary electromagnetic field coupling. Accordingly, it is possible to realize the high isolation between the WCDMA (Band 2) transmission system circuit and the WCDMA (Band 2) reception system circuit.

Ground port electrodes PMGND are provided in a central area in a plan view of the fourteenth layer between the port electrode PMct1, the port electrode PMct2, and the port electrode PMct3 and the port electrodes PMcr1, the port electrodes PMcr2, and the port electrodes PMcr3. This allows the high isolation to be ensured between the transmission system circuit and the reception system circuit also on the mounting surface.

Although the examples in which the port electrodes and the mounting electrodes to be connected are connected to each other only via the via electrodes are described in the above preferred embodiments, for example, wiring may be performed with certain inner layer electrodes within a range corresponding to the mounting areas of the SAW filters in a plan view. Also with this configuration, it is possible to ensure the high isolation between the transmission system circuit and the reception system circuit of the same communication signal.

The wiring electrode patterns, the mounting electrodes, and the alignment pattern of the port electrodes of the multilayer body 900B described in the above third preferred embodiment are applicable to the high-frequency module 10 in the first preferred embodiment and the high-frequency module 10A in the second preferred embodiment. In this case, also in the high-frequency module 10 in the first preferred embodiment and the high-frequency module 10A in the second preferred embodiment, it is possible to ensure the high isolation between the transmission system circuits and the reception system circuits in the multilayer bodies 900 and 900A. In addition, since the via electrodes for the WCDMA (Band 5) communication signals the frequency band of which is spaced apart from those of the WCDMA (Band 1) communication signals and the WCDMA (Band 2) communication signals exist between the via electrodes for the WCDMA (Band 1) communication signals and the via electrodes for the WCDMA (Band 2) communication signals the frequency bands of which are close to each other, it is possible to improve the isolation at these via electrodes.

Figure 10:
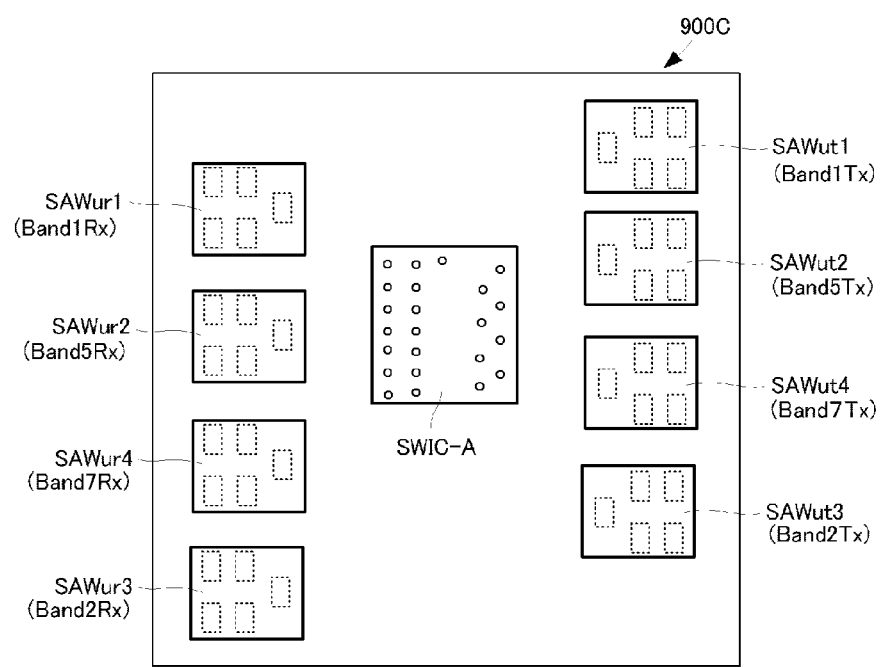
FIG. 10 is a mounting diagram of a top surface for describing the structure of a high-frequency module 10C according to a fourth preferred embodiment of the present invention.

A high-frequency module according to a fourth preferred embodiment will now be described with reference to the drawing. FIG. 10 is a mounting diagram of the top surface for describing the structure of a high-frequency module 10C according to the present preferred embodiment.

Although the examples in which the communication signals of different types (WCDMA (Band 1), WCDMA (Band 2), and WCDMA (Band 5)), which are the WCDMA communication signals, are transmitted and received in one high-frequency module are described in the above preferred embodiments, an example in which the communication signals of four types, which are the WCDMA communication signals, are transmitted and received in one high-frequency module is described in the present preferred embodiment. Specifically, the WCDMA (Band 1) communication signals, the WCDMA (Band 2) communication signals, the WCDMA (Band 5) communication signals, and the WCDMA (Band 7) communication signals are transmitted and received. The basic circuit configuration and so on are the same as those in the above preferred embodiments. Specifically, the structure is adopted in which the common terminal of the switching element SWIC is connected to the antenna and the duplexer for each communication signal is connected to each individual terminal of the switching element SWIC.

The switching element SWIC-A, the SAW filters SAWut1 and SAWur1 of the duplexer DUP1, the SAW filters SAWut2 and SAWur2 of the duplexer DUP2, the SAW filters SAWut3 and SAWur3 of the duplexer DUP3, and SAW filters SAWut4 and SAWur4 of a duplexer DUP4 are mounted on the top surface of a multilayer body 900C of the high-frequency module 10C of the present preferred embodiment.

The SAW filters SAWut1, SAWut2, SAWut4, and SAWut3, which are the transmission-side filters of the corresponding duplexers, are mounted along the second side of the top surface of the multilayer body 900C at certain intervals. Specifically, the SAW filter SAWut2 for the WCDMA (Band 5) communication signals and the SAW filter SAWut4 for the WCDMA (Band 7) communication signals the frequency bands of which are spaced apart from those of the WCDMA (Band 1) communication signals and the WCDMA (Band 2) communication signals are mounted between the SAW filter SAWut1 for the WCDMA (Band 1) communication signals and the SAW filter SAWut3 for the WCDMA (Band 2) communication signals the frequency bands of which are close to each other. With this configuration, it is possible to increase the isolation between the WCDMA (Band 1) transmission system and the WCDMA (Band 2) transmission system, as in the above preferred embodiments.

In addition, the SAW filter SAWut4 for the WCDMA (Band 7) communication signals the frequency band of which is farther spaced apart from the frequency band of the WCDMA (Band 2) communication signals, compared with the frequency band of the WCDMA (Band 1) communication signals, is arranged at the SAW filter SAWut2 side and the SAW filter SAWut2 for the WCDMA (Band 5) communication signals the frequency band of which is spaced apart from the frequency bands of both the WCDMA (Band 1) communication signals and the WCDMA (Band 2) communication signals is arranged at the SAW filter SAWut1 side. With this configuration, it is also possible to increase the isolation between the WCDMA (Band 7) transmission system circuit and the WCDMA (Band 1) and WCDMA (Band 2) transmission system circuits.

The SAW filters SAWur1, SAWur2, SAWur4, and SAWur3, which are the reception-side filters of the corresponding duplexers, are mounted along the first side of the top surface of the multilayer body 900C at certain intervals. Specifically, the SAW filter SAWur2 for the WCDMA (Band 5) communication signals and the SAW filter SAWur4 for the WCDMA (Band 7) communication signals the frequency bands of which are spaced apart from those of the WCDMA (Band 1) communication signals and the WCDMA (Band 2) communication signals are mounted between the SAW filter SAWur1 for the WCDMA (Band 1) communication signals and the SAW filter SAWur3 for the WCDMA (Band 2) communication signals the frequency bands of which are close to each other. With this configuration, it is possible to increase the isolation between the WCDMA (Band 1) reception system and the WCDMA (Band 2) reception system, as in the above preferred embodiments.

In addition, the SAW filter SAWur4 for the WCDMA (Band 7) communication signals, the frequency band of which is more spaced apart from the frequency band of the WCDMA (Band 2) communication signals, compared with the frequency band of the WCDMA (Band 1) communication signals, is arranged at the SAW filter SAWur2 side and the SAW filter SAWur2 for the WCDMA (Band 5) communication signals the frequency band of which is spaced apart from the frequency bands of both the WCDMA (Band 1) communication signals and the WCDMA (Band 2) communication signals is arranged at the SAW filter SAWur1 side. With this configuration, it is also possible to increase the isolation between the WCDMA (Band 7) reception system and the WCDMA (Band 1) and WCDMA (Band 2) transmission systems.

The switching element SWIC-A is mounted at a central portion of the top surface of the multilayer body 900C in a plan view. With this configuration, it is possible to increase the isolation between the transmission system SAW filter group and the reception system SAW filter group, as in the above preferred embodiments.

The non-limiting examples in which the three or four duplexers are used are described in the above preferred embodiments, the configurations of the above preferred embodiments are applicable to non-limiting examples in which three or more duplexers are used and similar effects and advantages are achieved in such examples.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A high-frequency module that transmits and receives a plurality of communication signals at least including a first communication signal, a second communication signal, and a third communication signal, the high-frequency module comprising:
  a switching element that selects one individual terminal from at least three individual terminals and connects the selected individual terminal to a common terminal; and
  demultiplexers that are connected to the respective at least three individual terminals of the switching element; wherein the switching element and the demultiplexers are mounted on a front surface of a multilayer body of the high-frequency module;

the first communication signal, the second communication signal, and the third communication signal each include a transmission signal and a reception signal;

a difference between a frequency band of the first communication signal and a frequency band of the second communication signal is smaller than a difference between the frequency band of the first communication signal and the frequency band of the third communication signal and a difference between the frequency band of the second communication signal and the frequency band of the third communication signal; and a third demultiplexer through which the third communication signal is transmitted is mounted between a mounting position of a first demultiplexer through which the first communication signal is transmitted and a mounting position of a second demultiplexer through which the second communication signal is transmitted.

2. The high-frequency module according to claim 1, wherein a difference between the transmission signal of the first communication signal and the reception signal of the second communication signal is smaller than a difference between the first communication signal and the third communication signal and a difference between the second communication signal and the third communication signal.

3. The high-frequency module according to claim 1, wherein the first demultiplexer, the second demultiplexer, and the third demultiplexer each include a transmission-side filter and a reception-side filter, which are defined by separate elements; and the transmission-side filters and the reception-side filters are mounted so as to be spaced apart from each other on the front surface of the multilayer body.

4. The high-frequency module according to claim 3, wherein the switching element has a substantially quadrangle shape in a plan view, a power supply terminal is arranged adjacent to one side in the plan view, and the switching element is mounted on the front surface of the multilayer body so that the other side opposing the one side is at a side where the transmission-side filters are mounted.

5. The high-frequency module according to claim 3, wherein a circuit element other than the switching element and each filter of each demultiplexer is mounted on the front surface of the multilayer body; and the other circuit element is mounted between the switching element and the transmission-side filters.

6. The high-frequency module according to claim 3, wherein external-connection port electrodes including a transmission signal input port electrode are provided for each communication signal on a rear surface of the multilayer body; and a transmission signal input terminal of each transmission-side filter and the transmission signal input port electrode are arranged so that the transmission signal input terminal is at least partially overlapped with the transmission signal input port electrode in a plan view of the multilayer body.

7. The high-frequency module according to claim 6, wherein an electrode on which the transmission signal input terminal of the transmission-side filter is mounted is connected to the transmission signal input port electrode only via a via electrode provided in a stacking direction of the multilayer body.

8. The high-frequency module according to claim 6, wherein a reception signal output port electrode is provided for each communication signal on the rear surface of the multilayer body; and a reception signal output terminal of each reception-side filter and the reception signal output port electrode are arranged so that the reception signal output terminal is at least partially overlapped with the reception signal output port electrode in a plan view of the multilayer body.

9. The high-frequency module according to claim 8, wherein an electrode on which the reception signal output terminal of the reception-side filter is mounted is connected to the reception signal output port electrode only through a via electrode provided in a stacking direction of the multilayer body.

10. The high-frequency module according to claim 3, wherein the transmission-side filters are integrally provided in a single housing.

11. The high-frequency module according to claim 3, wherein the reception-side filters are integrally provided in a single housing.

12. The high-frequency module according to claim 3, wherein the switching element is mounted between an area where the transmission-side filters are mounted and an area where the reception-side filters are mounted.

* * * * *